United States Patent [19]
Brown

[11] Patent Number: 6,021,961
[45] Date of Patent: Feb. 8, 2000

[54] CROSSOVER-RESISTANT PLURAL COMPONENT MIXING NOZZLE

[75] Inventor: Daniel P. Brown, Palos Park, Ill.

[73] Assignee: Flexible Products Company, Marietta, Ga.

[21] Appl. No.: 09/045,959

[22] Filed: Mar. 6, 1998

[51] Int. Cl.[7] ................................................ B05B 1/30
[52] U.S. Cl. .................... 239/398; 239/400; 239/414; 239/428; 239/432; 239/570; 239/600
[58] Field of Search .................................. 239/349, 400, 239/414, 417.5, 428, 432, 570, 600, 398

[56] References Cited

U.S. PATENT DOCUMENTS

| | | |
|---|---|---|
| 578,150 | 3/1897 | Kerns . |
| 951,889 | 3/1910 | Teuer . |
| 1,043,683 | 11/1912 | Fieser . |
| 2,103,838 | 12/1937 | Bach . |
| 2,187,119 | 1/1940 | Fish . |
| 2,550,591 | 4/1951 | Parsons . |
| 2,935,248 | 5/1960 | Gerteis . |
| 3,602,009 | 8/1971 | Powell . |
| 3,784,110 | 1/1974 | Brooks ................................ 239/414 X |
| 3,807,445 | 4/1974 | McPhee . |
| 3,983,900 | 10/1976 | Airhart . |
| 4,117,551 | 9/1978 | Books et al. . |
| 4,179,883 | 12/1979 | Nishiyama et al. . |
| 4,222,407 | 9/1980 | Ruschke et al. . |
| 4,257,458 | 3/1981 | Kondo et al. . |
| 4,379,681 | 4/1983 | Goudy, Jr. . |
| 4,415,003 | 11/1983 | Paradis et al. . |
| 4,458,831 | 7/1984 | Holleran et al. ..................... 239/414 X |
| 4,487,437 | 12/1984 | Dickirson . |
| 4,538,508 | 9/1985 | Ballard . |
| 4,556,086 | 12/1985 | Raines . |
| 4,565,214 | 1/1986 | Parman . |
| 4,603,813 | 8/1986 | Luegering ............................ 239/432 X |
| 4,676,437 | 6/1987 | Brown . |
| 4,712,583 | 12/1987 | Pelmulder et al. . |
| 4,762,149 | 8/1988 | Pickl, Jr. . |
| 4,762,253 | 8/1988 | Palmert ............................... 239/414 X |
| 4,765,372 | 8/1988 | Beecher . |
| 4,867,650 | 9/1989 | Ikeda et al. . |
| 4,880,143 | 11/1989 | Murray et al. . |
| 4,954,252 | 9/1990 | Griffin et al. . |
| 4,958,661 | 9/1990 | Holtermann et al. . |
| 4,991,882 | 2/1991 | Gähwiler . |
| 4,993,596 | 2/1991 | Brown . |
| 5,044,675 | 9/1991 | Sauer . |
| 5,116,315 | 5/1992 | Capozzi et al. ..................... 239/432 X |
| 5,117,738 | 6/1992 | Horner, Jr. . |
| 5,129,581 | 7/1992 | Braun et al. . |
| 5,144,986 | 9/1992 | Drew . |
| 5,213,125 | 5/1993 | Leu . |
| 5,242,276 | 9/1993 | Shimizu . |
| 5,285,816 | 2/1994 | Herlihy . |
| 5,345,970 | 9/1994 | Leyderman et al. . |
| 5,374,084 | 12/1994 | Potokar . |
| 5,396,930 | 3/1995 | Ebbing et al. . |
| 5,421,368 | 6/1995 | Maalouf et al. . |
| 5,462,204 | 10/1995 | Finn .................................... 239/414 X |
| 5,529,245 | 6/1996 | Brown . |
| 5,595,406 | 1/1997 | Warchol . |

*Primary Examiner*—Andres Kashnikow
*Assistant Examiner*—Robin O. Evans
*Attorney, Agent, or Firm*—James T. FitzGibbon; Vedder, Price, Kaufman & Kammholz

[57] ABSTRACT

An anti-crossover nozzle with two principle pieces that snap together, having a forward end portion with a dispensing opening, a rear end portion which includes at least a pair of inlets. Each inlet has a center passage, therethrough and at least two valve leaflets biased by their own inherent resiliency to a normally closed position covering openings in the passages. There is at least one point of attachment formed between an interior surface of the rear end portion and the valve leaflets. The leaflets are displaced from their normally closed position by the force of incoming liquid foam components.

28 Claims, 3 Drawing Sheets

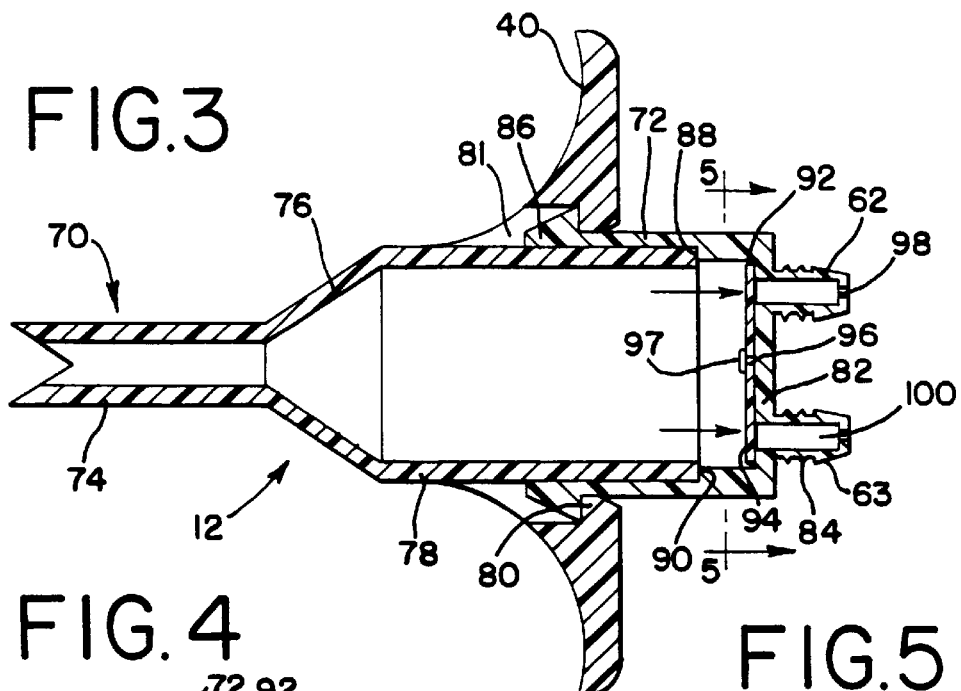
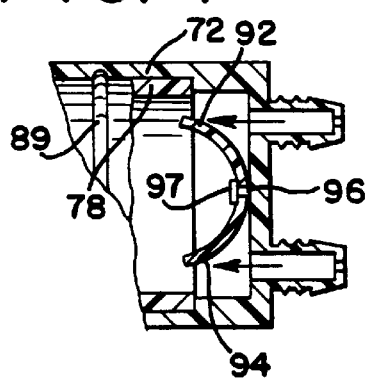
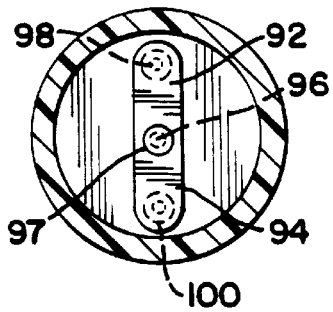
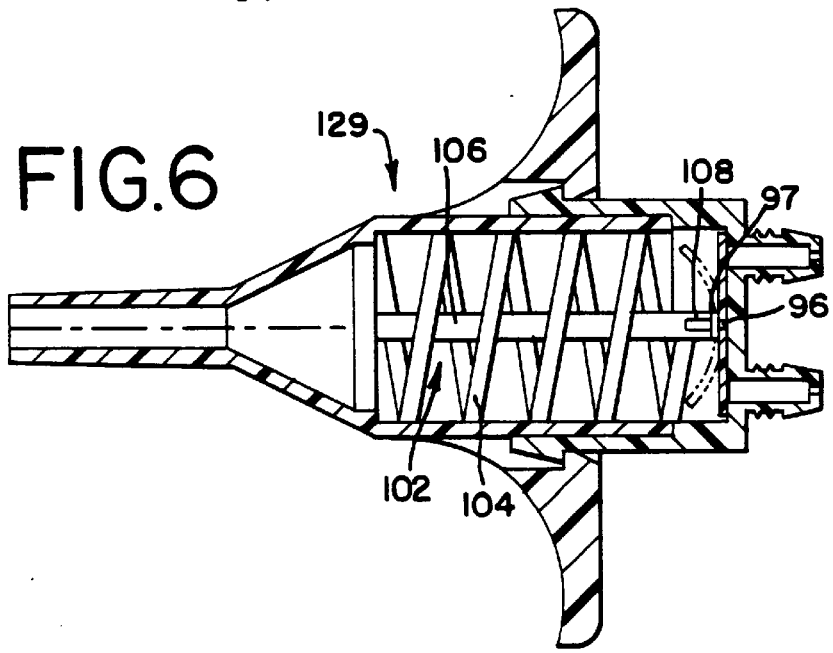

CROSSOVER-RESISTANT PLURAL COMPONENT MIXING NOZZLE

BACKGROUND OF THE INVENTION

The present invention relates generally to mixing and dispensing nozzles, and more particularly, to a so-called anti-crossover or crossover-resistant nozzle for use with multi-component systems, particularly urethane foams. In particular, the invention relates to readily attachable, disposable nozzles having two principal pieces that snap together, and two more additional pieces or components making up the entire nozzle. According to the invention, the nozzles can be reusable with a non-reacting foam or may be used again by flushing with solvent. Such nozzles, according to the invention, have both an anti-crossover feature and a snap-together assembly and are associated in use with a dispenser such as a foam gun for dispensing foam, or other device for dispensing a bead, spray or fillet of a foam insulation or like material.

In the prior art, a number of nozzles have been available for use with such dispensers, (most of which are commonly referred to as guns). However, most if not all of such nozzles did not have an inherent feature which prevents so-called crossover in use. Neither were they a molded, snap-together type construction. In a two-component urethane gun, both the isocyanate component and the resin component are metered under a supply pressure to a disposable mixing nozzle. Such a device, for example, was made by the assignee of the Brooks U.S. Pat. No. 3,784,110, which was the first commercially successful two-component foam gun having a disposable or throwaway nozzle.

A disposable low cost nozzle is important for multi-component mixing and metering systems, because, after a short time, (from one-half a minute to two minutes), the components making up the mix or other thermosets react to cure and set up in the nozzle, and thereby render further mixing, particularly on ratio mixing of reactants difficult or impossible. Once used in a properly functioning gun, the mixing nozzle is simply removed and thrown away. This technique avoids the use of costly, and potentially harmful solvents for flushing.

In one use, the isocyanate component and the resin component are simultaneously admitted to a mixing nozzle in a predetermined ratio. This ratio is determined by the design of the system, chemistry of the reactants, and particularly by the size of the orifices leading into the nozzle passages, and by the supply pressure under which the components are maintained.

In one method, which uses aerosol type reactants, when the dispenser trigger is actuated, two valves open simultaneously and a desired proportion of each component is injected by the material supply force through the nozzle orifices and into the mixing and dispensing nozzle. Upon entering the mixing and dispensing nozzle, both the materials instantaneously experience a pressure drop, causing the gas in the material to expand rapidly as it passes along the mixing elements of the mixing nozzle. This expansion of materials creates turbulence and continues to mix as the reactants travel forward along the mix path of the nozzle. This mixing initiates a chemical reaction between the components, which causes the reactants to polymerize.

As the polymerizing mass exits the nozzle, it is under great force due to the supply pressure, vaporization of the blowing agents, along with the energy and gas generation created through the polymerizing reaction. Upon leaving the nozzle, the discharge pattern of the reacting material can be defined and controlled by any of a number of nozzle geometries resulting in a high force spray pattern, or a much lower force pour pattern, depending on the application.

In another practice of the art as described in U.S. Pat. No. 5,529,245, non-aerosol type of reactants are processed through a mixing nozzle as described in this invention. In this method, non-aerosol materials are delivered via the supply pressure through the dispenser—once activated—into a mixing nozzle of the current invention. The two materials are injected by the material supply force through the nozzle orifices and into the mixing nozzle. Upon entering the mixing nozzle, the materials are mixed by turbulent flow as the material travels through the mixer.

The mixing initiates a chemical reaction within the nozzle and in the case of some foaming materials, $CO_2$ is generated in the reaction, causing the polymerizing mass to expand. In this method, if a spray pattern is desired, a third stream of gas is delivered through the nozzle to the tip where the material exits. This gas stream is used to assist in spraying the mixed polymerizing material onto the substrate. As in the previously described embodiment, the reacting material can be defined by any of a number of nozzle geometries.

Past experience has proven that there are some shortcomings to the old mixing nozzle design. In previous mixing nozzle designs there are circumstances that can occur during the course of mixing that create an opportunity for one or more of the reactants to flow rearward into the passages of the dispenser.

This rearward flow creates or allows a condition of chemical reaction within the dispenser, causing the passages of the dispenser to be clogged with reacted material. This situation, commonly referred to as "crossover", is the major cause of product failure with these types of dispensing systems. When the passages of the dispenser system become clogged, the system is now rendered either completely useless, or at least useless to meter components "on ratio", due to the complete or partial blockages in one passage or another.

There are several common conditions that create the opportunity for crossover. One of the most common conditions occurs where the operator, upon first starting the operation of the kit, fails to open both supply lines to the dispenser. Thus, when the dispenser is activated, only one component enters the mixing chamber. At this time, there is no competing pressure or flow from the other supply port of the valve or mixer inlet, and consequently, nothing to prevent the single component within the mixer from flowing rearwardly out the other inlet passage and into the dispenser.

Once the operator realizes that only one component is flowing, he understands the problem. Then he opens the second supply valve and pressurizes the dispenser with the second, previously missing component. At that time the second component mixes with the first in the dispenser valve and hoses with the "crossed over" component, thus causing a reaction and fouling the dispenser.

A second situation occurs when the operator activates the dispenser with a previously used and clogged or partially clogged nozzle. At this time, and according to the pressure within the system at this time, the nozzle is charged with more reactants but the outlet passage of the nozzle is blocked. This produces a situation wherein the reactants are reacting and generating high pressures internally within the mixing nozzle.

Because the discharge tip is blocked reactants cannot be discharged from the end of the nozzle, the reacting, and hence expanding material continues to expand forcibly within the nozzle. If, at this time, the operator pulls the trigger of the dispenser without ejecting the nozzle, a crossover condition arises due to the rearward flow by the reacting material into the dispenser. This rearward drive is created due to the higher pressure present in the nozzle when compared to the line pressure feeding the dispenser. Particularly when portable kits are used that are not full and/or at the highest pressure, the pressure created in this type of crossover within the nozzle can overcome the supply pressure and drive reacting material rearward into the dispenser, thus fouling the dispenser.

A third crossover condition exists as a result of simple pressure differences occurring between the two pressure streams, where one stream is strong enough to overcome the other, forcing a condition of rearward flow of the component that otherwise would be urged into the nozzle under the lower or weaker pressure. This particularly occurs if a new container is used with an old or nearly-exhausted one. This situation also arises when using supply pumps and there is a pump failure.

Accordingly, it is an object of the present invention to provide an improved mixing and dispensing nozzle for urethane foam or similar multi-component systems.

Another object of the invention is to provide mixing and dispensing nozzle components which can be assembled by the simple process of snapping one component inside the other, thereby trapping the third component in the dispenser, with the anti-crossover valves being secured in place.

Yet another object of the invention is to provide a mixing and dispensing nozzle which contains an internal set of valve leaflets normally serving to close off the rearward flow of material into the dispenser or gun.

Still another object of the invention is to provide a combination of a multi-piece nozzle which can be easily assembled, together with leaflet style valves restricting crossover contamination in the use of the apparatus.

A further object of the invention is to provide a multi-piece nozzle which includes a baffle mixing element having vanes disposed around a central backbone and having the backbone engage the rear wall of one of the components of the valve as an aid to assembly.

A still further object of the invention is to provide a valve for each of plural inlets and having a single leaflet, made from a thin sheet of plastic film such as a polypropylene, a polyester or the like.

An additional object of the invention is to provide a single valve assembly comprising a pair of leaflets disposed to either side of a thermally welded or mechanically or adhesively affixed portion which attaches the center portion of the leaflet to the rear wall of the nozzle.

Another object of the invention is to provide a nozzle that snaps together and includes wings or finger-gripping handles on the body of the nozzle. A still further object is to provide a snap-together construction which includes a molded-in rib or gasket between the sections to insure a tight fit.

The invention achieves its objects and advantages in two ways. The first is to provide a telescoping, snap action type assembly for mixing and dispensing nozzles, with optional wings or finger-gripping portions, and the other is to provide a valve, preferably in the form of leaflets, for two or more inlet openings, with the valve leaflets extending over the opening and closing them off by their own innate resiliency, and remain forcibly closed by the internal pressure within the mixing nozzle. At the same time, ready opening occurs under the force of incoming liquid components, with the valve leaflets being preferably affixed to the rear wall of the nozzle by thermal attachment, by an adhesive, or mechanical entrapment.

The manner in which these objects and advantages are achieved in practice will become more clearly apparent when taken in connection with a detailed description of the preferred embodiments of the invention set forth by way of example and shown in the accompanying drawings, in which like reference numbers indicate the corresponding parts throughout.

BRIEF DESCRIPTION OF THE DRAWINGS

FIG. 3 is a vertical sectional view of one form of nozzle of the invention, showing the two-element snap-together construction of the shell, showing the valves in a closed position of use and schematically showing a load or force acting to return the valves to their seated positions;

FIG. 4 is a fragmentary view, partly in elevation and partly in section, and similar to FIG. 3, but showing the anti-crossover valves in an open position and a preferred form of rib providing additional sealing between components of the nozzle;

FIG. 5 is a sectional view, taken along lines 5—5 of FIG. 3, showing the valves and the valve passages in phantom lines;

FIG. 6 is a sectional view of another form of nozzle of the invention, showing the same with a mixing element in place within the unit, securing the valve leaflet hold-down mechanism, showing a slightly different discharge end to the nozzle, and showing the valve leaflet in two different positions, one in solid lines and one in phantom lines;

DESCRIPTION OF THE PREFERRED EMBODIMENTS OF THE INVENTION

While it will be understood that the invention may be embodied in a number of different forms, and that somewhat different styles of gun may be used with the form of nozzle shown, and while it is also understood that the invention may comprise nozzles in which the shells are of a two-piece construction but lack the anti-crossover valves, and vice versa, the invention will be described where the dispenser is a gun of the presently preferred type, and is shown to include a nozzle which includes both features of construction and operation. Likewise, dispensers other than guns may use the nozzles of the invention, and the use of the term "gun" is to be taken in its broad sense as including dispensers of various types.

Figure 1:
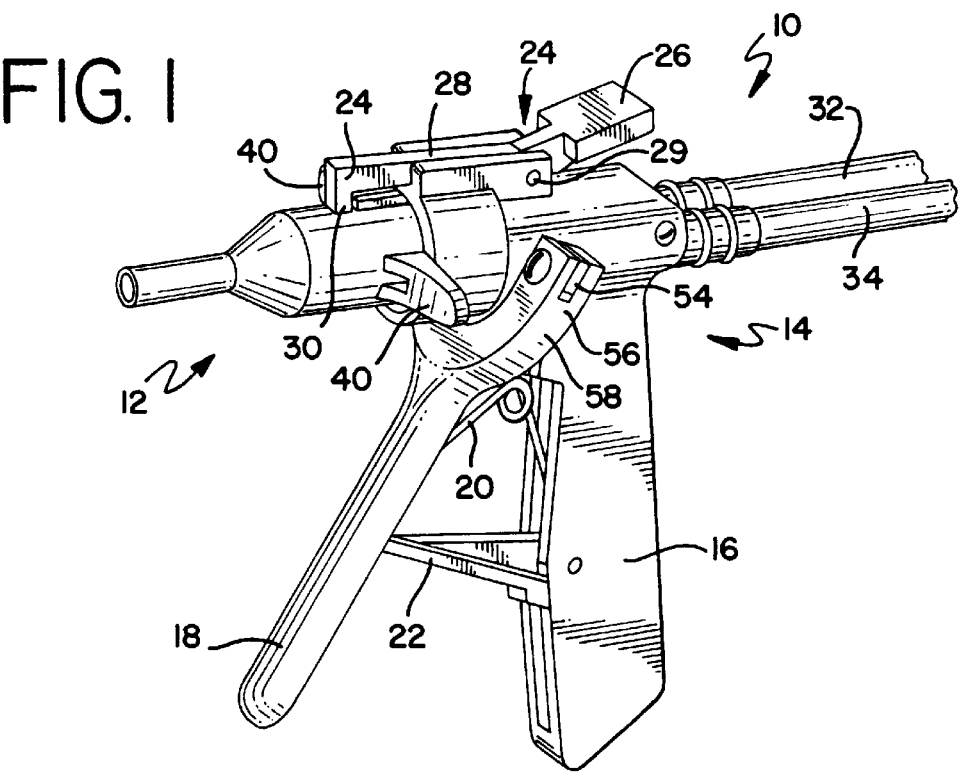
FIG. 1 is a perspective view of the nozzle of the invention, shown associated with a dispensing gun with which it is normally used.
Figure 2:
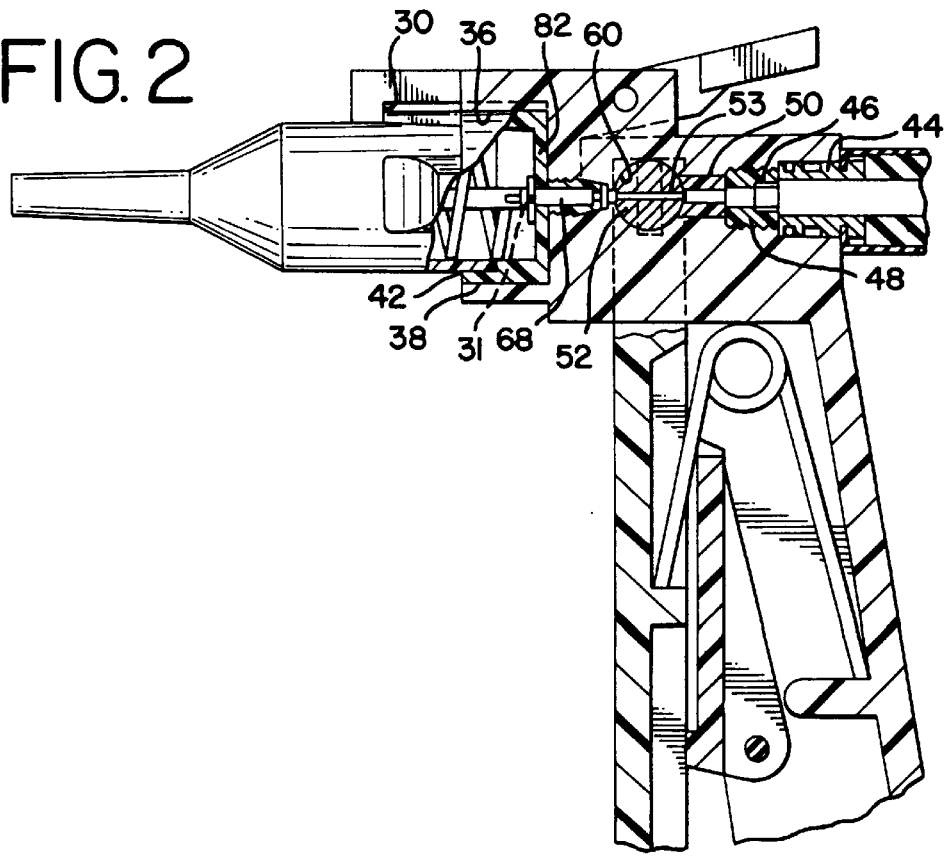
FIG. 2 is a fragmentary view, partly in elevation and partly in section, showing certain parts of the gun and nozzle of the invention.

Referring now generally to the drawings, and more particularly, to FIGS. 1 and 2, there is shown a gun generally designated 10, including a nozzle 12, a gun body generally designated 14, a handle 16, a trigger 18, a trigger return spring 20 and a safety 22. In addition, the gun contains a latching and locking mechanism for the nozzle generally designated 24, and shown to include a thumb button 26 which actuates a lever 28 having a claw 30 on the forward end portion thereof.

The lever pivots about the point 29, and in another position of use, the ejector 31 serves to forcibly remove the nozzle from the gun. The gun is served by two hoses 32, 34 which contain reacting products, and may optionally have another hose (not shown) beneath it for a propellant (or for an additional propellant).

In addition, the gun body 14 shown in FIG. 2 includes a receiver 36 for accommodating an enlarged diameter portion 38 of the nozzle 12. The nozzle is shown to include a pair of wings 40 or finger grips which are able to be manipulated by the fingers of an operator in positioning and seating the nozzle shoulder 42 for engagement by the claw 30.

The hoses 32, 34 include a forward end portion 44, which engages the butt end of a reducer 46 that in turn engages a hollow screw 48 which compresses the hollow valve seat 50. This unit is made from a deformable material, such as, for example, polyethylene or PTFE. Other expedients may be used with equal effect. The valve seat snugly engages a spool 52 with passages 53 lying centrally therein. The spool 52 is actuated by the trigger 18 through ears 54 on the ends of the spool, which are engaged by slots 56 in the bifurcated portion 58 of the trigger 18.

The spool valve 52 (FIG. 2) moves in an opening 60 in the body 14. It rotates so as to align, in an operative position, its central passages 53 into a position of registry with the outlet passages 68 in the gun body. The nipples 62 on the rear end 82 of the nozzle 12 fit snugly but removably into the passages 68.

Referring now to the nozzle 12, and particularly to FIGS. 3–6, this unit has a shell composed of two elements, an inner, forward nozzle element generally designated 70 and an enlarged diameter back cap generally designated 72. As shown in FIG. 3, for example, the forward end of the nozzle 12 is typically composed of a reduced diameter outlet end 74, a tapered intermediate side wall portion 76 and an back cap 78 of generally cylindrical configuration. Near the end of the enlarged cylindrical portion 78 are the formations defining the ears or finger grips 40. This section of the nozzle also includes a flexible latch 80 and two formed recesses 81 for purposes to be described. At least six other forms of nozzles may be used, but the differences between them lie in the shapes of their dispensing openings and in other details, and they all fall within the scope of the invention.

The enlarged diameter portion 72 of the nozzle 12 includes a rear end wall 82, a pair of substantially identical nipples 62, 63, each preferably including plural sealing ribs 84. Each of the nipples 62, 63 has an inlet passage 98, 100 for ingredients and these may be of the same or different orifice sizes. The forward end of the back cap 72 of the nozzle 12 includes a pair of barbs 86 or like formations for fitting snugly within the recess 81 just behind the flexible latch 80. A shoulder surface 88 is formed in the enlarged diameter end 72 to engage the rear surface 90 of the reduced diameter cylindrical portion 78. These shoulders preferably meet at about ¼" to ½" from the end wall 82, to allow for clearance of the valve leaflets to be described. A circumferential bead 89 (FIG. 4) is provided which crushes to form a tight seal between the components 78, 72 of the nozzle 12. The inner sleeve 78 expands slightly under pressure to engage the outer sleeve 72 more snugly.

Referring now to the interior of the nozzle 12, there are shown a pair of oppositely directed leaflets 92, 94 forming the operative portions of the anti-crossover valves joined to the rear surface 82 of the nozzle 12 by a combination post 96 having a staked rivet head 97 on its end portion.

In the alternative, a heat-seal may be used. In such a case, the plastic from which the leaflets 92, 94 are made is coated with an adhesive or low-melting coating such as an ethylene vinyl acetate (EVA) layer. The leaflets 92, 94 in one embodiment are made from a single sheet of a thin plastic material, such as a 0.005" polyester sheet material having an innate resiliency, enabling it to spring back repeatedly even after several uses. Making the leaflets from polyester with an EVA or like lower-melting layer enables them to be joined to the remainder of the nozzle by heat sealing. As a third alternative, an adhesive may be used.

Referring now to FIG. 6, a mixer assembly generally designated 102 is shown to be in place with the nozzle 12a. The mixer includes a plurality of vanes 104 surrounding a center stem 106. In this embodiment, a portion 108 of the stem 106 fits over the post 96 and helps secure the leaflet in place. In one embodiment, the end portion 108 serves to replace the rivet head 97.

Referring now to the use of the apparatus of the invention, the nozzle assembly is simple and straightforward. The baffle assembly 102 is placed within the forward component 70 of the nozzle 12. Then, the two components are placed in alignment and the forward component is pushed to the rear and the rear component is pushed to the front until the barbs 86 engage the flexible latch 80. This also has the effect of pressing the rear end portion 108 of the baffle stem 106 firmly against the enlarged head 97 of the post 96 which holds the leaflets 92, 94 in place. In the alternative, the head 97 may be omitted altogether.

Assuming there is an old nozzle 12 in the gun 10, the lever 28 is actuated by depressing the thumb pad 26, thereby causing the ejector 31 to eject the old nozzle and preparing the gun for entry of a new nozzle. When a new nozzle is grasped by the wings or finger engaging portions, and urged towards the rear of the gun with the nipples engaging thru passages 62, the nozzle slides to the rear against the slight resistance created by the ribs 84 on the nipples. This movement will inherently push down the ejector 31 and engage the claw 30. Thereupon, the gun is suited to be actuated.

When it is desired to use the gun, the trigger 18 is pulled rearwardly, thus rotating the spool 52 and causing the passage 53 therein to become aligned with the outlet passage 68 in the gun body. The liquid components then flow into the chamber, moving the valve leaflets to the approximate position of FIG. 4. When the liquid components forming the urethane foam have passed into the nozzle, and the trigger is released, the leaflets will tend towards the closed position, again, awaiting the next injection of foaming material.

However, if for any reason, including blockage of the nozzle, failure to turn on both supply lines, or lower pressure in one of the supply lines, the affected leaflet (the one having a reduced or no bearing pressure tending to unseat it) will remain in the closed position to prevent any amount of the other material from entering the subject passage. If material were to enter the passage, the reaction and setting up would then take place in the body of the gun, causing an erratic functioning thereof. At the least, this would require a complete cleaning of the gun, and at worst, the gun would have to be discarded. Bearing in mind that the foam is a thermoset foam, this could be difficult or problematical. An obstruction in the passage, even if not complete, would tend to throw off the stoichiometry of the mix and cause an off-ratio or otherwise less than desirable foam to exit the nozzle.

Figure 7:
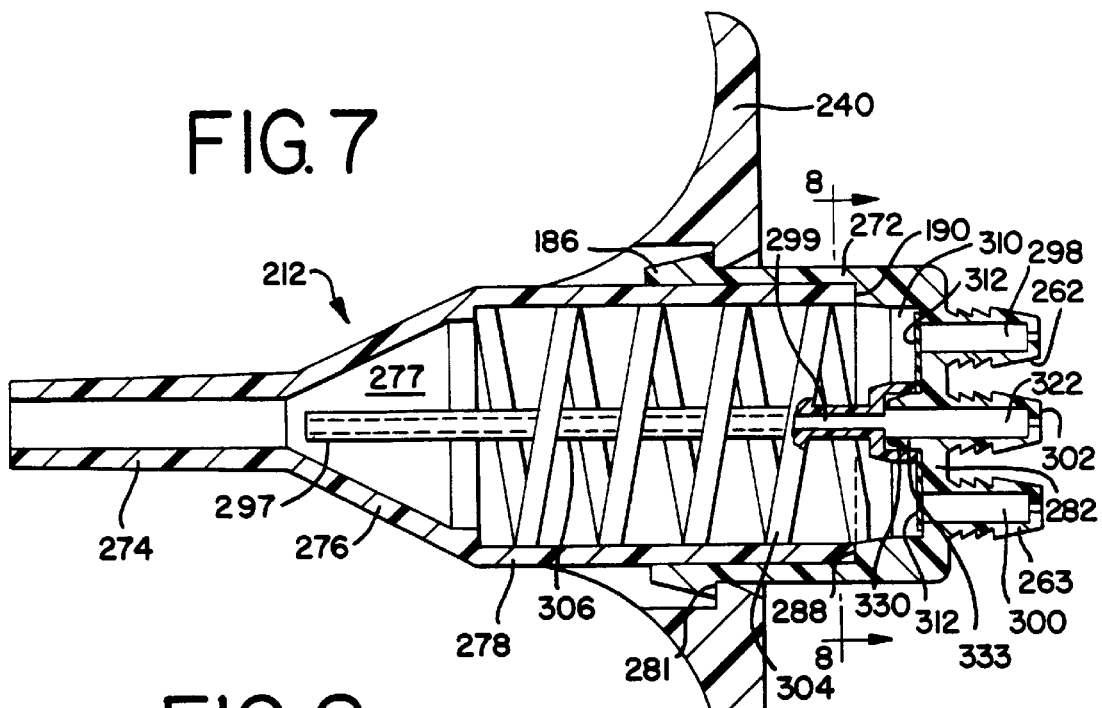
FIG. 7 is a vertical sectional view of a modified nozzle of the invention.
Figure 8:
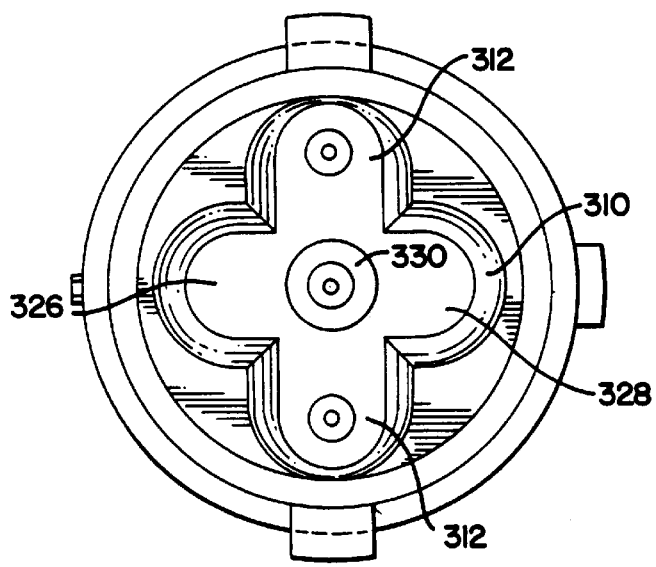
FIG. 8 is a plan view of the end portion of the nozzle, taken along lines 8—8 of FIG. 7.
Figure 9:
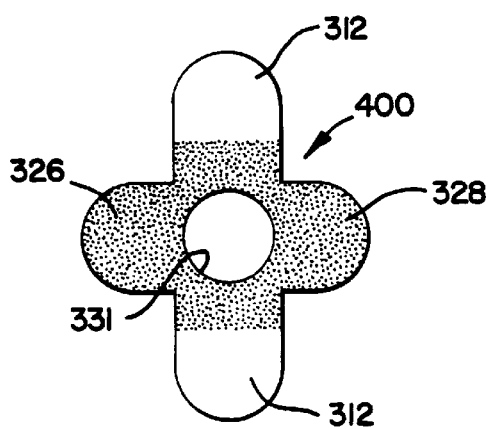
FIG. 9 is a plan view taken from the bottom and showing the leaflet of FIGS. 7 and 8.

Referring now to FIGS. 7–9, another embodiment of the invention is shown. Here, in FIG. 9, a four-leaved valve member generally designated 400 is shown. On two of the legs 326, 328 is a coating of adhesive and two of the other legs 312 are free from adhesive. A center opening 331 is present through which the truncated post 333 (FIG. 7) extends. The leaflet 400 is located at the bottom surface of a well or countersink portion 310 formed in the back wall 282 of the nozzle 212.

The well or countersink 310 is preferably, for example, formed in four sections, each corresponding approximately to the shape of the valve leaflets. Once in place, the valve leaflet may be held by an adhesive as shown at 326, 328; or the valve body may be held in place by a collar 330 which surrounds the opening 331 and hold the valve leaflet in place over the truncated post 333. The collar 330 holds the leaflet down when the collar is pressed into place during assembly of the unit. As desired, the collar may be used with or without an adhesive.

By reason of having the leaflets 312 disposed movably in the well 310, while the leaflets 326, 328 are glued down, they are very securely mounted. In use, liquid ingredients pass through the inlet passages 298, 300 in the nipples 262, 263. The passage 322 in the nipple 302 provides an inlet for gas or the like, which may travel up the central tube 299 to its outlet 297 where it is mixed with the reacting ingredients.

In an alternative construction, the ingredients reaching the baffle may not be foamed, but may be frothed or foamed by the gas escaping from the end 297 of the center bore in the passage 299 of the backbone 306. This action takes place in the chamber 277 defined by the side walls 276, 274.

The remainder of the application is similar to the earlier embodiments, in that the nozzle generally designated 212 has a pair of wings 240. Each of the two barbs 186 fits into the recesses 281 inside the wing roots 240. The nozzle unit 212 includes an enlarged diameter rear element 272, a reduced diameter cylindrical portion 278, tapered intermediate side wall section 276, and a reduced diameter outlet 274. In addition, the unit includes a rear end wall 282 which meets the end 190 of the cylinder 278 at shoulder 288. These surfaces register when the nozzle is fully assembled, and the collar 330 is firmly in place against the valve assembly 400. The nozzle includes in its interior a plurality of baffles 304 surrounding a hollow center stem 306. The stem 306 terminates in the collar 330 of enlarged diameter, and the center passages 322, 299 are in alignment with each other. Although plastic is preferred for use in making the valves 400, 92, 94, other suitable materials may be used. For example, a metal foil or film may be used.

Another feature of the construction resides in the manner in which the claw 30 of the retainer-ejection mechanism 28 holds the nozzle 12 in place. By having a grip on the holders 201 on the forward component of the nozzle body rather than on the end cap, a fracture of the bond between these components will not allow the forward part of the nozzle to ride forward, thus spilling the contents.

It will thus be seen that the present invention provides a novel multi-piece nozzle having a pair of leaflet valves held in place by mechanical entrapment, a heat seal or adhesive, having a number of the advantages and characteristics pointed out and others which are inherent in the invention. It is anticipated that modifications and variations to the invention will occur to those skilled in the art and it is anticipated that such modifications and changes may be made to the described form of the invention without departing from the spirit of the invention, or the scope of the appended claims.

I claim:

1. A mixing and dispensing nozzle for use with a plural component dispenser, said nozzle having at least two passages therein for admitting at least first and second components of said material, said nozzle comprising, in combination, a forward end portion with a dispensing opening, a transition surface and a tubular body portion, a rear end wall portion which includes at least a pair of inlets, each inlet having a center passage therethrough, and at least two valve leaflets biased by their own inherent resiliency to a normally closed position and covering the openings in said passages afforded by said inlets, and at least one point of attachment formed between an interior surface of said rear end wall and said valve leaflets, said leaflets being able to be displaced from their normally closed position by the force of incoming liquid foam components.

2. A nozzle as defined in claim 1, wherein said pair of inlets are in the form of a pair of nipples adapted for reception in a dispensing apparatus.

3. A dispensing nozzle as defined in claim 1, in which said at least two valve leaflets are formed as the end portions of a single valve assembly.

4. A dispensing nozzle as defined in claim 1, wherein said at least two valve leaflets are formed as portions of a single valve body, said at least one point of attachment being formed by a boss in said rear end wall of said nozzle and a mounting opening formed in said valve body.

5. A dispensing nozzle as defined in claim 4, wherein said boss formed in said rear end wall includes an enlarged diameter head portion overlying said opening in said center portion of said valve body and securing said valve body in place.

6. A dispensing nozzle as defined in claim 1, wherein said valve leaflets are formed as the end portions of a valve body, said point of attachment being formed between said leaflets adjacent the midpoint thereof.

7. A dispensing nozzle as defined in claim 4, wherein said nozzle further includes a baffle having a center stem and wherein said point of attachment includes a portion of said stem engaging said valve body.

8. A dispensing nozzle as defined in claim 4, wherein said nozzle further includes a baffle having a hollow center stem, said center stem including a collar adjacent the rear end wall of said nozzle, said collar engaging said valve assembly about the center thereof.

9. A mixing and dispensing nozzle comprising, in combination, a generally tubular body portion, a reduced diameter outlet portion, and a rear end portion having at least a pair of inlet openings extending outwardly from the rear end of said rear wall, said rear end portion also having an interior rear wall surface including a countersunk portion terminating in at least two relatively flat areas surrounding said inlet openings, respectively, a valve leaflet covering each of said inlet openings and being at least slightly smaller than said countersunk areas, and at least another portion of said countersunk area having a hold-down connection, insuring that the valve leaflet in use, will remain in place covering said inlets when acted upon by an internal pressure greater than the external pressure in said inlets.

10. A nozzle as defined in claim 9, wherein said valve leaflets are formed on a single valve body, and wherein said portion of said area having a hold-down connection includes a boss for engaging a center opening in said valve body.

11. A nozzle as defined in claim 9, wherein said valve leaflets are formed on a single valve body, and wherein a portion of said area having a hold-down connection includes a single area disposed at least partially between said valve leaflets, and said hold-down connection comprises an adhesive connection therein.

12. A nozzle as defined in claim 9, wherein said valve leaflets are formed on a single valve body, wherein at least two relatively flat areas comprise four relatively flat areas, and wherein two of said areas contain said hold-down connection in the form of an adhesive connection between a portion of said valve body and said rear end wall of said nozzle.

13. A nozzle as defined in claim 9, wherein said valve leaflets are formed as the end portions of a single valve body, and wherein said hold-down connection includes a boss in said rear end wall, said nozzle further including a baffle with a center stem and a collar, said collar extending over said boss and securing said valve body in place.

14. A nozzle as defined in claim 9, wherein said valve leaflets are formed as the end portions of a single valve body, said nozzle further includes a mixing baffle and a center stem, and said hold-down connection includes a boss in said rear end wall and a collar extending thereover and securing said valve body in place.

15. A nozzle as defined in claim 9, wherein said valve leaflets are formed as the ends on a single valve body, said nozzle further including a baffle therein, a third inlet opening in said rear wall, a boss surrounding said third inlet opening in said rear wall, said baffle assembly including a hollow stem, said stem also including a collar extending around said boss and serving to hold said valve body in place.

16. A nozzle as defined in claim 9, wherein said valve leaflets are formed from two end portions of a generally cruciform valve body, and wherein two of said leaflets cover said inlet openings and at least two other of said leaflets extend into additional areas, said additional areas and said portions of leaflets extending into them being adhesively attached.

17. A nozzle as defined in claim 15, wherein said nozzle includes a third inlet opening in said rear wall, wherein a boss surrounds said opening, wherein said nozzle includes a baffle with a hollow stem, a portion of said hollow stem surrounding said boss and holding said valve body in place.

18. A multi-piece, snap-together mixing and dispensing nozzle, said mixing and dispensing nozzle comprising, in combination, a first, forward component and a second, rearward component, said forward component having a dispensing opening at the forward end thereof, a substantially tubular main body portion, and a second, rearward component having a rear wall portion with at least a pair of inlets on said rear wall, one of said forward and rearward components having a pair of wings extending outwardly therefrom, said wings including flexible latching elements, and the other of said components having a pair of barbs thereon, with one of said components being an enlarged diameter unit and the other a reduced diameter unit, whereby said components will achieve a telescoping, snug radial fit between said components, and whereby said barb and said flexible latching elements will snap together to provide a snug, locking axial fit.

19. A nozzle as defined in clam 18, wherein one of said components includes a radially biased seal unit to insure said snug radial fit.

20. A multi-piece, snap-together mixing and dispensing nozzle for a chemical dispenser, said mixing and dispensing nozzle comprising, in combination, a first, forward component and a second, rearward component, said forward component having a dispensing opening at the forward end thereof, a substantially tubular main body portion, including at least two wing portions located forwardly of the rear end of the tubular side wall portion, and a pair of rearwardly opening recesses adjacent the roots of said wings, said recesses being defined in part by latching elements, and said second, rearward component having a rear wall portion with at least a pair of nipples extending rearwardly therefrom, passages extending through said nipples, a tubular forward extension surface, and a pair of barbs, each of which is congruent with at least a part of said recess, said barbs, said recesses and said flexible latching elements being constructed and arranged so that upon engagement, said flexible latching element will deflect and said barbs will extend into said recess.

21. A nozzle as defined in claim 20, wherein said second component includes a shoulder adapted to contact the rearmost surface of said first component in snug engagement as said barbs engage said latching elements.

22. A nozzle as defined in claim 20, in which said at least two nipples comprises three nipples.

23. A nozzle as defined in claim 20, in which said at least two passages are closed off by valve leaflets.

24. A nozzle as defined in claim 23, in which said valve leaflets comprises the end portions of a valve body, said valve body being held in place in said nozzle by a hold-down connection at the center thereof.

25. A nozzle as defined in claim 24, wherein said hold-down connection comprises an adhesive connection.

26. A nozzle as defined in claim 23, in which said rear wall portions include a countersunk region with at least two flat areas surrounding said passages extending through said nipples, and with said valve leaflets lying within said areas.

27. A nozzle as defined in claim 24, which further includes a baffle having a center stem, and wherein said end portion of said center stem comprises said hold-down connection.

28. A nozzle as defined in claim 27, in which said nozzle further includes a boss at the center of said valve body, wherein said stem is hollow, wherein said stem includes a collar at the end thereof, and wherein said hold-down connection comprises said collar extending over said boss and engaging said valve body.

\* \* \* \* \*